(12) United States Patent
Kaltenbacher et al.

(10) Patent No.: US 7,538,877 B2
(45) Date of Patent: May 26, 2009

(54) VARIABLE EXPOSURE ROTARY SPECTROMETER AND METHOD OF USE

(75) Inventors: Eric Kaltenbacher, St. Petersburg, FL (US); Robert H. Byrne, St. Petersburg, FL (US); David P. Fries, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 196 days.

(21) Appl. No.: 11/555,417

(22) Filed: Nov. 1, 2006

(65) Prior Publication Data

US 2007/0052962 A1 Mar. 8, 2007

Related U.S. Application Data

(63) Continuation-in-part of application No. 11/160,337, filed on Jun. 20, 2005, now abandoned, which is a continuation of application No. PCT/US03/40877, filed on Dec. 22, 2003.

(60) Provisional application No. 60/319,806, filed on Dec. 20, 2002.

(51) Int. Cl.
*G01J 3/30* (2006.01)

(52) U.S. Cl. ....................................................... 356/418

(58) Field of Classification Search .................. 356/418; 348/270–271; 359/890–892
See application file for complete search history.

(56) References Cited

U.S. PATENT DOCUMENTS

| | | | | | |
|---|---|---|---|---|---|
| 4,401,694 | A | * | 8/1983 | Quick et al. | 438/96 |
| 4,744,667 | A | * | 5/1988 | Fay et al. | 356/417 |
| 5,155,585 | A | * | 10/1992 | Ishikawa | 348/360 |
| 5,424,543 | A | * | 6/1995 | Dombrowski et al. | 250/330 |
| 5,545,897 | A | * | 8/1996 | Jack | 250/339.13 |
| 6,269,182 | B1 | * | 7/2001 | Ishii | 382/165 |
| 6,657,720 | B1 | * | 12/2003 | Kaselis | 356/317 |

* cited by examiner

*Primary Examiner*—Kara E Geisel
(74) *Attorney, Agent, or Firm*—Molly L. Sauter; Smith & Hopen, P.A.

(57) ABSTRACT

The present invention relates to instruments used to analyze materials with light-absorbing properties and their methods of use. More specifically, the invention relates to the use of adjustable optical filters whereby light-absorption can be measured in more detail and with greater variables than what is currently known in the art.

31 Claims, 5 Drawing Sheets

VARIABLE EXPOSURE ROTARY SPECTROMETER AND METHOD OF USE

CROSS REFERENCE TO RELATED APPLICATIONS

This application is a continuation-in-part of and claims priority to currently pending U.S. Utility patent application Ser. No. 11/160,337, entitled, "Variable Exposure Rotary Spectrometer", filed Jun. 20, 2005.

FIELD OF INVENTION

This invention relates to instruments used to analyze materials with light-absorbing properties. More specifically, the invention relates to systems that use sensors to measure the properties of components of subject systems.

BACKGROUND OF THE INVENTION

Spectrometers are well-known in the art of analytical instruments. For many years they have been used as detector systems, concentration measurers and combinations of both. Over the years sophisticated and highly-sensitive instruments have become the norm, especially in laboratory environments, but because of desire to perform more field analyses, portable units have been developed. Because of their size and portability, most of these units are not suitable for the high-caliber studies that the lab versions are capable of performing, thus making a need for high-quality and reliable portable systems paramount in the field. In addition, there is also a desire for less bulky but highly accurate instruments for laboratory use. Plus, it is desired that the instrument be adaptable for a wide variety of analyses, and not just limited to certain types of compounds or analytes.

Absorption spectroscopy is based on the principle of colorimetry, which involves the determination of a substance from its ability to absorb light. Light is passed through the test sample (which is a solution or a transparent substance) and the amount of light absorbed by the sample is recorded. The wavelength at which the absorbance took place is also recorded. This absorption spectrum not only provides quantitative data on the light absorbance characteristics of the sample, but can also serve as a "fingerprint" for qualitatively identifying the absorbing substance.

Spectrometric measurements of light are performed in basically two ways, dispersion-based techniques and filter-based techniques. In the dispersion-based approach, a radiation dispersion device such as a prism or diffraction grating is used to separate the incident polychromatic light into its spectral contents. The spectrally separated light is then projected onto a photo detector to measure the relative intensity in each spectral range.

The present invention provides a spectrometer that is easily adapted for analysis of materials over a wide range of wavelengths, irrespective of the intensity of the strength of the light fields. By use of a rotating filter wheel mechanism, it is possible to electronically or optically vary the sensitivity and exposure of the instrument according to the intensity of the measured light field.

SUMMARY OF INVENTION

In accordance with the present invention, a method for measuring the spectral characteristics of a light source comprising a plurality of wavelengths is provided.

The method includes the steps of, positioning an optical detector to receive the light from the light source, positioning an optical filter between the light source and the optical detector, the optical filter comprising a plurality of filter elements, each of the plurality of filter elements to filter at least one of the plurality of wavelengths, exposing each of the plurality of filter elements to the light source and controlling the duration of time that each of the plurality of filter elements is exposed to the light source.

In a particular embodiment, the method step of controlling the duration of time that each of the plurality of filter elements is exposed to the light source further includes, fixing each of the plurality of filter elements between the light source and the optical detector for a predetermined period of time.

In an additional embodiment in which each of the plurality of filter elements is a predetermined size and shape, the step of controlling the duration of time that each of the plurality of filter elements is exposed to the light source further includes, passing each of the filter elements between the light source and the optical detector at a predetermined rate, such that the combination of the filter size and shape and the predetermined rate determines the duration of time that the filter element is exposed to the light source.

As such, if the optical filter includes a plurality of filter elements distributed circumferentially about a common radius of an optical disc filter, the disc rotation may be varied to place different filter elements within the optical pathway for different periods of time, thereby controlling the duration time that each of the filter elements is exposed to the light source. Optionally, the filter elements may vary in size such that if the disc is rotated at a constant rate, the duration time will vary based on the size of the filter element. Larger filter elements will experience a longer duration time in the optical pathway and smaller filter elements will experience a shorter duration time in the optical pathway. A combination of varying filter size and rotation speed is within the scope of the present invention.

The present invention provides a multi-spectral sensor capable of sensitive light measurements at different wavelengths. The spectrometer comprises a light source and an optical detector in optical communication with the light source, the light source and the optical detector defining an optical pathway. An optical disc filter is positioned within the optical pathway between the light source and the optical detector. The optical filter comprises at least one filter element adapted to filter a particular wavelength of light. The spectrometer also includes a motor coupled to the optical disc filter. The motor serves to rotate the optical disc filter at selective rates.

In a preferred embodiment, the optical disc filter comprises a plurality of filter elements distributed circumferentially about a common radius of the optical disc filter. Each of the plurality of filter elements is adapted to filter a different wavelength of light emitted from the light source. It is within the scope of the invention to have a plurality of filter elements that are equal in size or differing in size.

In another embodiment, a control circuit is coupled to the optical detector. The control circuit varies the speed of the motor. It is within the scope of the invention to adjust the speed of the motor both manually and through the use of a feedback loop.

In another embodiment, a control circuit is coupled to the optical detector. The control circuit varies the speed of the motor. It is within the scope of the invention to adjust the speed of the motor both manually and through the use of a feedback loop.

In yet another embodiment, an exposure time control circuit controls the exposure time of the optical detector to the emitted light source. The exposure control circuit can be controlled both manually and through the use of a feedback loop.

Other aspects and advantages of the present invention can be seen upon review of the figures, the detailed description, and the claims, which follow.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
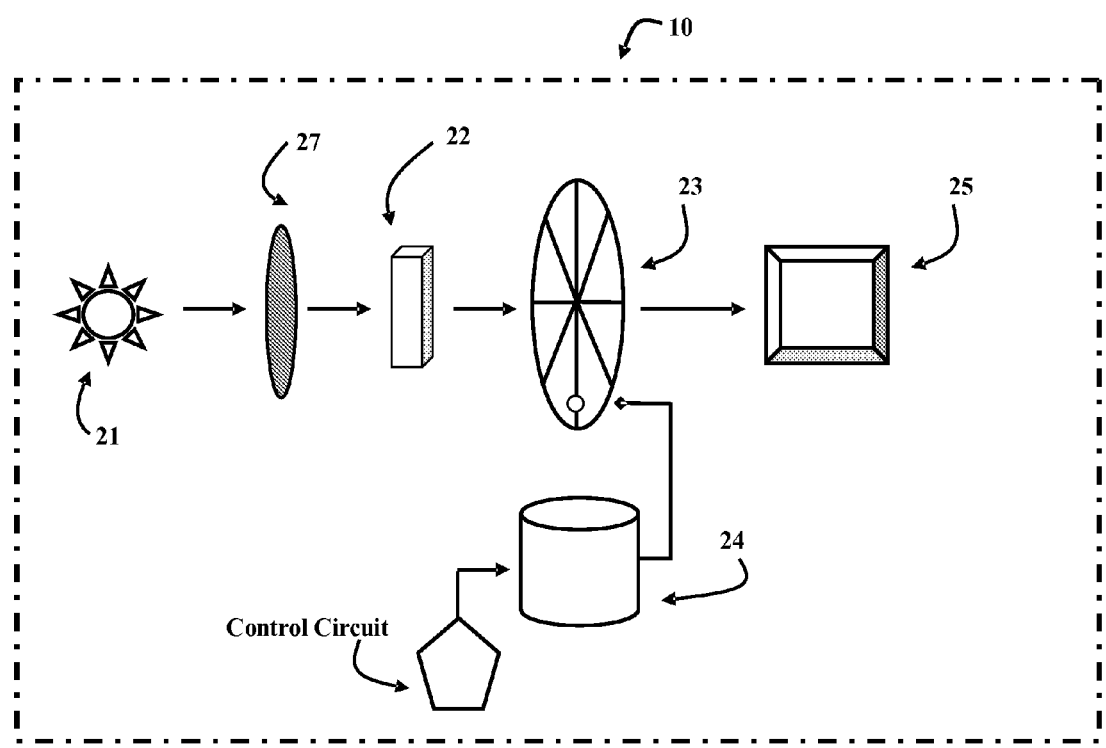
FIG. 1 is an overall view of a spectrometer utilizing the filter wheel of the instant invention.

Referring now to FIG. 1, the spectrometer 10 of the instant invention comprises a source means 21 in optical communication with a sample 22 and a detection means 25. Interposed in the optical path of the system is a wheel means 23, which is depicted here as a generally circular wheel having a plurality of filters 31 around its circumference.

The wheel means 23 is mechanically attached to drive a motor 24, which has variable speed capabilities. The optical path shown in FIG. 1 is linear, but any other non-linear configuration known to those of ordinary skill in the art is also within the scope of the invention.

The source means 21 may comprise a lamp, a fiber-optic device, a laser device, or any other light supplying means known to those of skill in the art. In addition, a supplemental focusing means 27 may be included depending on the choice of the source means 21 and detection means 25. The focusing means 27 may comprise a mirror array, a lens, or other similar device known for its optical focusing capabilities.

The sample 22 is removably inserted into the optical pathway and is contained by any suitable containing means. These include optical waveguides, cuvettes, transmissive containers, reflective containers, or any other containment means known in the art. The sample may be of any physical form and the optical path may proceed through the sample as in the case of liquids or gases, or be deflected off the surface of the sample for solids or opaque substances. Again, the optical pathway may be linear or non-linear depending on the analysis to be performed.

The detection means 25 is any suitable light sensing means and is selected according to the wavelength desired to be detected from all the systems available to one of ordinary skill in the art. It is understood that detectors may be chosen in combination with the source 21 and the supplemental focusing means 27 depending on the intended application of the spectrometer 10.

The use of variable exposure times facilitates accurate measurements when the intensity of light reaching the detector varies as a function of wavelength. This invention provides the ability to vary the exposure, or integration, time for each wavelength to be detected. This function is not found on other spectrometers.

Without this function, a single exposure time is used which is based on the most intense part of the spectrum. Measurements of current spectrometers usually involve recording the intensity at wavelengths other than the most intense region. It is not uncommon that these intensities are so low that the signal is barely detectable. By providing a variable, and programmable, exposure this invention permits virtually simultaneous and accurate measurements of both intense and weak signals. This invention allows for a weak signal to receive a longer exposure time, or integration time, thereby increasing the range of readable spectrum. Likewise, highly intensive regions can receive correspondingly lower exposure times, or integration times, to facilitate accurate readings.

The exposure time of the filter elements may be controlled by mechanical means or by opto-mechanical means. Through mechanical means the exposure time of each filter element is varied depending upon how long the filter element is positioned within the optical pathway.

In an additional embodiment, the filter elements may vary in size and shape. In accordance with this embodiment, the exposure time of each filter element may be varied opto-mechanically by adjusting the filter size and shape. The physical differences in the filter elements may then be used to vary the exposure time of each filter element. In the case of a filter disc having a plurality of filter elements distributed circumferentially about a common radius, the filter disc is rotated at a certain speed and the amount of exposure time for the detector is a function of how long a specific filter is in the optical pathway between the light source and the detector. The amount of exposure time varies with the size of the filter element. Such, that for a constant rate of rotation of the filter, a larger filter element will be positioned in the optical pathway longer than a smaller filter element. As such, variability in filter size and shape afford more variability in exposure time.

The motor means 24 serves to drive the filter wheel 23 and is selected to be either a constant or variable speed motor. Sensitivity may be modulated by means of varying the integration time, the motor speed, or a combination of both. This enables one of skill in the art to regulate the rotational speed of the wheel 23 to optimize sensitivity of the spectrometer 10 to fit a number of measurement conditions, including those where the sensitivity heretofore has been so low as to prevent accurate results. This motor means 24 again may be any suitable motor as available to one of skill in the art.

The motor means 24 is operated by way of a variety of selectivity means. These include manual dials or rheostats which enable the selection to be made by the equipment operator and include pre-selected and variable selection while the instrument is in operation. Electronically programmable means may also be employed. In an additional embodiment, a control circuit may be used, and this may be optimized by means of a feedback circuit responsive to the optical feedback needs of the detector.

Figure 2:
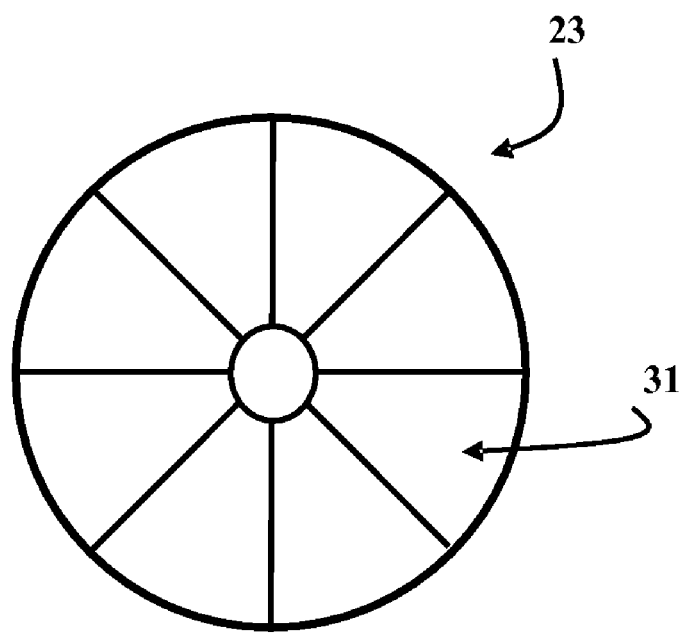
FIG. 2 is a depiction of one type of filter wheel configuration as described by the instant invention.

Referring now to FIG. 2, the filter wheel 23 comprises a generally circular plate 20 onto which is affixed a plurality of filter elements 31. These elements may be identical or may comprise any number of dissimilar elements. The elements 31 define with the motor 24 the amount and frequency of light transmitted to the detector 25 at any given time. In the case of multiple detecting means, this enables several wavelengths to be analyzed at a single time since the light beam is filtered sequentially by the elements 31 for each desired wavelength.

For example, a single sample could be analyzed without reconfiguration of the spectrometer for a plurality of wavelengths. By aid of the motorized filter wheel 23, the need for manual filter change or sample realignment is obviated. The 30 spectrometer of the present invention is ideal for portable usage, or simplified laboratory usage because of this advantage over known spectrometers. Furthering this example, a solution sample could be placed into the spectrometer and analyzed at, for example, seven different wavelengths. Because of the motorized filter wheel 23, each analysis, that is each exposure of the sample to the proper filtered wavelength, can be optimized for best results.

Moreover, the combination of the motorized filter wheel 23 and the infinite combinations of filters and filter shapes which the wheel contains enables an operator immense adjustability of the spectrometer. This freedom creates additional advantage for use in the field as the cumbersome nature of possessing many different filters and then manually having to adjust and account for the exposure time which decreases the accuracy and increases the overall time is removed by the present invention.

Figure 3:
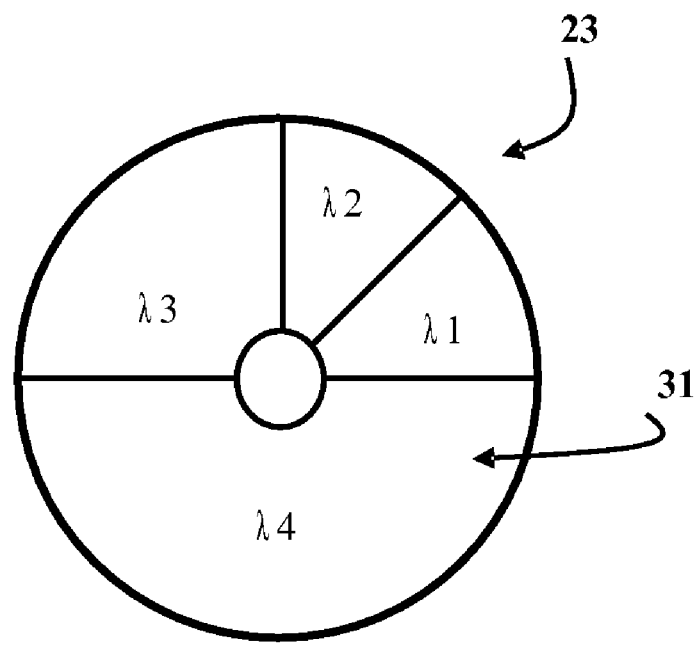
FIG. 3 is another configuration of the filter wheel of the instant invention employing varying size filter elements to filter various wavelengths of light.

The filter elements 31 may also be irregular in shape as shown in FIG. 3. When it is desired to filter a wavelength over a longer period of time, a larger filter 32 may be used alone or in combination with other filter elements 33 and 34. In this way, optical responses may be maximized, especially in situations where it is desired to block a certain wavelength longer or shorter than another wavelength. In addition, the speed of the motor 24 is also variable so that fine adjustments may be made using the rotational speed ability to further refine the sensitivity.

The filter wheel 23 may be made of any suitable material, such as metal, with the filters inserted therein. In addition, the wheel 23 and the filtering material may be of the same material with optical coatings defining the filtering portions and the spacing portions of the wheel. By depositing filters onto the disc itself, more freedom in the function of the filters is allowed. As such, a continuously variable frequency response is attainable using a disc with deposited filter elements. Additionally, a filter disc having a reduced size, corresponding to lighter weight and less inertia is attainable with deposited filter elements. A system utilizing a disc having less inertia allows for a faster response time and a more economical system. In addition, it is contemplated that the filter portion of the wheel may be any portion of the light spectrum, up to and including the total spectrum. Since the filtering of light is a function of both filter material and the rotation of the element, a wide variety of parameters may be used to affect the desired sensitivity.

As depicted, the filter wheel 23 is generally circular, but other shapes such as ellipsoidal and even square may be used. Again, the shape is selected to be compatible with the other components of the spectrometer 10.

Figure 4:
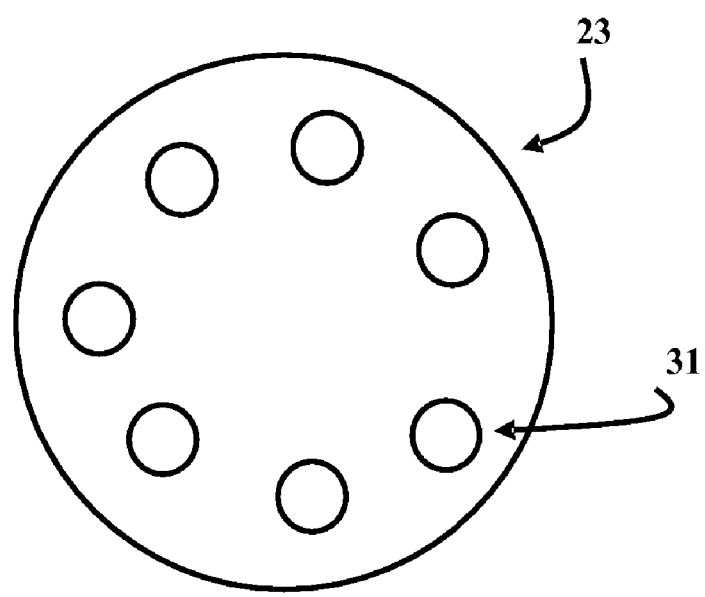
FIG. 4 shows a further configuration of the filter wheel assembly.

Referring now to FIG. 4, this embodiment of the present invention shows the filter wheel 23 having seven equally sized and spaced filter elements 31. As described herein, each filter element 31 may be able to filter out the same wavelengths as the other filter elements. It is also possible, to have each filter element 31 be able to filter out a different wavelength than at least one other filter element. The use of such different filters enables the spectrometer 10 of the present invention to generate diverse data for a single sample without having to reconfigure, or at least minimally reconfigure, the spectrometer.

Figure 5:
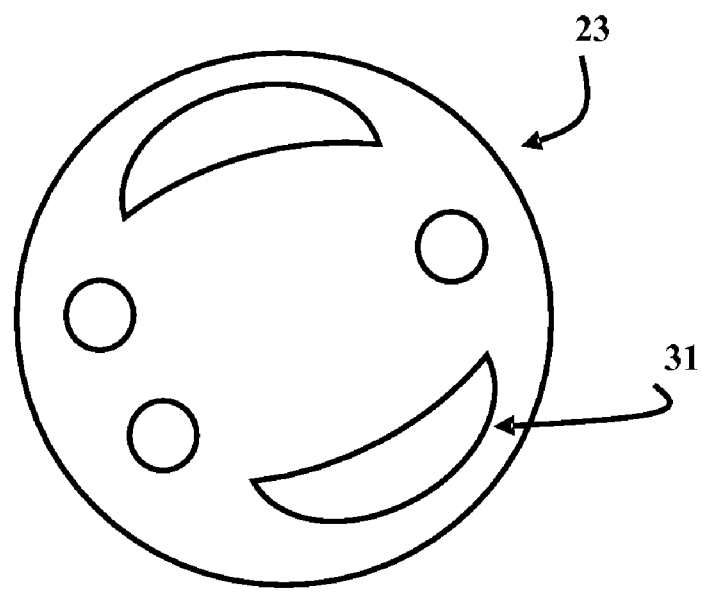
FIG. 5 shows a further configuration of the filter wheel assembly.

Referring now to FIG. 5, this embodiment of the present invention shows the filter wheel 23 having five filter elements 31. In this embodiment the filter elements 31 are neither the same size nor are they uniformly distributed around the circumference of the filter wheel 23. The present configuration allows for light to be filtered at a certain wavelength longer, or shorter, which enables a plurality of different data to be obtained from one sample analysis.

In operation, the rotation of the filter wheel 23 enables generation of a multiplicity of data readouts in a very short period of time. Due to the beam chopping function of the spinning wheel, discrete measurements occur in a small finite period of time, enabling the instrument to perform the analysis task without a need for manipulation to achieve multiple readouts of the sample. In addition, a variety of different readouts is possible. This is due to the filter wheel construction wherein a plurality of differing filter elements may be housed. In addition, due to the ability to selectively filter, the ability to make small changes in filtering the light is possible because the appropriate filters can be available on the same wheel as are complete changes to the configuration without a great deal of effort. Because of the filter wheel assembly of the instant invention, it is possible by simply varying the integration time to control the sensitivity of the system, and indeed, this is a preferred embodiment of the invention. Control of the detector sensitivity is easily made by changing the times the detector is active. Nevertheless, alternate embodiments, such as varying the speed of the motor means and combinations of varying both the motor speed and integration time are considered to be within the scope of the invention, as are use of control circuits to regulate speed and time intervals via feedback circuits.

Since the sensitivity of the system is no longer dependent on the detector alone, by using the filter system, it is possible to use less sensitive and costly detectors, thus making the instrument more attractive for a wide variety of applications where costly apparatus is a deterrent. Given the aspect of a control circuit, it is easy to optimize the parameters to detect or quantify samples by using secondary wavelengths that have not been within the scope of practicality without the use of sophisticated equipment. Indeed, since sensitivity is now a time dependent variable by using the filter system, secondary emission or absorption lines may be used for spectral studies.

Because the system is modulated by the filter wheel 23, it is also possible to change the analysis parameters easily by substitution of filter wheels. In this manner it is possible to change sensitivity in difficult analyses; or even to switch to another complete analysis mode altogether, by changing the wheel to insert filter elements for another application. This gives a great amount of flexibility to the instrument for a wide variety of studies or, because of its low-cost nature, it can also be used to detect trace amounts in a dedicated system with varied rotation times and filtering elements making difficult analyses easily performed.

The filter wheel 23 as heretofore described is generally circular in shape, with continuous rotation giving the variability. It is considered within the scope of the instant invention that other geometries may be employed, including but not limited to, ellipsoidal, square, and even linear. The driving motors may also be modified to accommodate these geometries. For example, oscillating motors could be used for moving the filter wheel arrangement in a reciprocating movement in the optical pathway. Because of the simplicity of the rotating embodiment with respect to the mechanics involved, this is considered a preferred configuration.

In addition, a plurality of filter wheels 23, each comprising filtering elements, may be used as an alternate embodiment to the single filter wheel assembly. In this case, each filter wheel may separately rotate, or some of the filter wheels in this embodiment may be stationary with other wheels rotating at the same time. Again, these may be connected to a feedback circuit, and the rotating parameters may be controlled for maximizing sensitivity for any given application.

It is also within the scope of this invention that the spectrometer be configured using a linear optical filter. Here, instead of the filter elements being positioned about a wheel, the filter elements are linearly arranged. Instead of the filter elements being rotated, the elements are moved via sliding or equivalent motion. As was seen with the optical filter wheel described above, the linear arrangement can be fixed to a motor means allowing for similar control and results as detailed in that discussion.

Likewise, by varying the size and shape of the filter elements in the linear filter arrangement, similar control over length of exposure to the light source for a given wavelength would be seen. Because the spectrometer of the present invention seeks to minimize the configuration, or reconfiguration, time associated with multiple readings of a single sample, the spectrometer must be able to vary the time which a sample is exposed to the source light through the desired filter. For example, certain wavelengths of light may require longer periods of exposure to enable a proper analysis. The present invention enables the operator to adjust the length of time each filter element is in the position for conducting a reading.

It is also within the scope of this invention to adapt the spectrometer construction using microelectronic and mechanical systems (MEMS) techniques. MEMS processes will allow the construction of the device on the microscopic scale.

Although the invention has been described with reference to a particular preferred embodiment with its constituent parts, features and the like, these are not intended to exhaust all possible arrangements, mechanical and electrical equivalents, or features, and indeed many other modifications and variations will be ascertainable to those of skill in the art.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for measuring the spectral characteristics of a light source comprising a plurality of wavelengths, the method comprising the steps of:
   positioning an optical detector to receive the light from the light source;
   positioning an optical filter between the light source and the optical detector, the optical filter comprising a plurality of filter elements, each of the plurality of filter elements to filter at least one of the plurality of wavelengths;
   moving the optical filter at a constant rate between the light source and the optical detector such that each of the plurality of filter elements is exposed to the light source, wherein the constant rate is such that a maximized optical response is achieved for at least one of the plurality of filter elements;
   varying the constant rate to achieve a plurality of constant rates at which the optical filter is moved between the light source and the optical detector, wherein each of the plurality of constant rates is such that a maximized optical response is achieved for at least one of the plurality of filter element; and
   measuring the spectral characteristics of the light source for each of the plurality of filter elements at each of the plurality of constant rates.

2. The method of claim 1, wherein varying the constant rate is mechanically controlled.

3. The method of claim 1, wherein varying the constant rate is opto-mechanically controlled.

4. The method of claim 1, wherein each of the plurality of filter elements is a predetermined size, and wherein the optical response of each of the filter elements under a constant rate is maximized by varying the size of the filter element.

5. The method of claim 1, wherein the optical filter comprises a plurality of filter elements distributed circumferentially about a common radius of an optical disc filter, and moving the optical filter at a constant rate further comprises, rotating the optical disc filter about the common radius.

6. The method of claim 1, wherein the optical filter comprises a plurality of various sized filter elements distributed circumferentially about a common radius of an optical disc filter, moving the optical filter at a constant rate further comprises, rotating the disc filter about the common radius such that each of the plurality of filter elements is positioned between the light source and the optical detector for a specific duration of time dependant upon the size of the filter element.

7. A spectrometer comprising:
   a light source;
   an optical detector for measuring the spectral characteristics of the light from the light source, the optical detector in optical communication with the light source, wherein the light source and the optical detector define an optical pathway;
   an optical filter, comprising a plurality of filter elements;
   a motor coupled to the optical filter and adapted to move the optical filter at a constant rate to position each one of the plurality of filter elements within the optical pathway, wherein the constant rate is such that a maximized optical response is achieved for at least one of the plurality of filter elements; and
   an exposure time control circuit in circuit communication with the motor, the exposure time control circuit to control the exposure time for each one of the plurality of filter elements by varying the constant rate at which the optical filter is moved within the optical pathway, wherein varying the constant rate is such that a maximized optical response is achieved for at least one of the plurality of filter element.

8. The spectrometer of claim 7, wherein the optical filter comprises a plurality of filter elements distributed circumferentially about a common radius of an optical disc filter.

9. The spectrometer of claim 8, wherein each of the plurality of filter elements is adapted to filter more than one different wavelength of light emitted from the light source.

10. The spectrometer of claim 8, wherein the optical disc filter comprises a plurality of filter elements distributed circumferentially about a common radius of the optical disc filter where the plurality of filter elements vary in size.

11. The spectrometer of claim 8, wherein the optical disc filter comprises a plurality of filter elements distributed circumferentially about a common radius of the optical disc filter where the plurality of filter elements vary in shape.

12. The spectrometer of claim 8, wherein the optical disc filter is the disc itself with wavelength selective coatings deposited on the disc.

13. The spectrometer of claim 8, wherein the spectrometer is made using MEMS processes.

14. The spectrometer of claim 7, further comprising a control circuit coupled to the optical detector and adapted to vary the rate of the motor.

15. The spectrometer of claim 14, wherein the control circuit comprises a manual adjustment.

16. The spectrometer of claim 14, wherein the control circuit comprises a feedback loop for automatically controlling the speed of said motor.

17. The spectrometer of claim 7, wherein the exposure time control circuit is manual.

18. The spectrometer of claim 7, wherein the exposure time control circuit is electrical.

19. The spectrometer of claim 7, wherein the exposure time control circuit further comprises a feedback loop for automatically controlling the exposure time.

20. The spectrometer of claim 7, wherein the optical filter comprises a plurality of filter elements distributed linearly along the optical filter.

21. The spectrometer of claim 20, wherein the plurality of filter elements is adapted to filter more than one different wavelength of light emitted from the light source.

22. The spectrometer of claim 7, wherein the optical filter comprises a plurality of filter elements distributed linearly along the optical filter where the plurality of filter elements vary in size.

23. The spectrometer of claim 7, wherein the optical filter comprises a plurality of filter elements distributed linearly along the optical filter where the plurality of filter elements vary in shape.

24. The spectrometer of claim 7, wherein the plurality of filter elements are distributed on a filter holding apparatus.

25. The spectrometer of claim 24, wherein the plurality of filter elements are adapted to filter more than one different wavelength of light emitted from the light source.

26. The spectrometer of claim 24, wherein the optical filter comprises a plurality of filter elements distributed along the filter holding apparatus where the plurality of filter elements vary in size.

27. The spectrometer of claim 24, wherein the optical filter comprises a plurality of filter elements distributed along the filter holding apparatus where the plurality of filter elements vary in shape.

28. The spectrometer of claim 24, wherein the optical filter is the filter holding apparatus itself with wavelength selective coatings deposited on the filter holding apparatus.

29. The spectrometer of claim 24, wherein the spectrometer is made using MEMS processes.

30. The spectrometer of claim 7, wherein the motor and the exposure time control circuit control the exposure time for each one of the plurality of filter elements through mechanical means.

31. The spectrometer of claim 7, wherein the motor and the exposure time control circuit control the exposure time for each one of the plurality of filter elements through opto-mechanical means.

* * * * *